(12) United States Patent
Shridhar et al.

(10) Patent No.: US 11,662,942 B2
(45) Date of Patent: May 30, 2023

(54) EXPLICIT BUFFER CONTROL

(71) Applicant: Kioxia Corporation, Minato (JP)

(72) Inventors: Avadhani Shridhar, San Jose, CA (US); Neil Buxton, Berkshire (GB); Steven Wells, Rancho Cordova, CA (US); Nicole Ross, Folsom, CA (US)

(73) Assignee: Kioxia Corporation, Tokyo (JP)

( * ) Notice: Subject to any disclaimer, the term of this patent is extended or adjusted under 35 U.S.C. 154(b) by 77 days.

(21) Appl. No.: 17/203,342

(22) Filed: Mar. 16, 2021

(65) Prior Publication Data

US 2022/0300194 A1   Sep. 22, 2022

(51) Int. Cl.
*G06F 3/06* (2006.01)
(52) U.S. Cl.
CPC .......... *G06F 3/0656* (2013.01); *G06F 3/0613* (2013.01); *G06F 3/0659* (2013.01); *G06F 3/0688* (2013.01)
(58) Field of Classification Search
CPC .... G06F 3/0656; G06F 3/0688; G06F 3/0659; G06F 3/0613

USPC ....................................................... 711/154
See application file for complete search history.

(56) References Cited

U.S. PATENT DOCUMENTS

| | | | |
|---|---|---|---|
| 10,539,973 B1* | 1/2020 | Piccardi | G11C 16/30 |
| 2010/0058003 A1* | 3/2010 | Goto | G11C 16/10 711/E12.001 |
| 2011/0208905 A1* | 8/2011 | Shaeffer | G11C 16/10 711/E12.008 |
| 2016/0041924 A1* | 2/2016 | Fields, Jr. | G06F 11/1092 714/6.23 |
| 2019/0287629 A1* | 9/2019 | Bang | G11C 27/00 |
| 2020/0089431 A1* | 3/2020 | Jung | G11C 11/4096 |
| 2020/0301612 A1* | 9/2020 | Jin | G06F 3/0656 |

* cited by examiner

*Primary Examiner* — Hashem Farrokh
(74) *Attorney, Agent, or Firm* — Allen & Overy LLP

(57) ABSTRACT

A memory storage system comprising a non-volatile semiconductor memory device comprising a memory array and a plurality of buffers, and a controller in communication with the plurality of buffers. The controller is configured to issue a command to the non-volatile semiconductor memory device specifying a subset of n buffers of the plurality of buffers in which to transfer a data payload relating to the command.

23 Claims, 5 Drawing Sheets

```
                                                                    300
   A  │  1. Data-Shift Write to buffer 4
      │  2. Data-Shift Write to buffer 5
      │  3. Data-Shift Write to buffer 6
      │  4. Media Program TLC buffers (4,5,6)
      │  5. Data-Shift Write to buffer 0 (transfers in parallel with step 4)
   B  │  6. Data-Shift Write to buffer 7 (transfers in parallel with step 4)
      │  7. Data-Shift Write to buffer 3 (transfers in parallel with step 4)
      │  8. Wait for Media Program TLC buffers (4,5,6) to complete
   C  │  9. Media Program TLC buffers (0,7,3)
```

FIG. 3A

```
                                                                    310
   A  │  1. Media Read buffer (1)
      │  2. Wait for Media Read buffer (1) to complete
      │  3. Media Read buffer (3)
   B  │  4. Data-Shift Read from buffer 1 (transfers in parallel with step 3)
      │  5. Wait for Media Read buffer (3) to complete
   C  │  6. Data-Shift Read from buffer 3
```

FIG. 3B

```
                                                                    320
      │  1.  Media Read buffer (1)
   A  │  2.  Data-Shift Write to buffer 2 (transfers in parallel with step 1)
      │  3.  Data-Shift Write to buffer 3 (transfers in parallel with step 1)
      │  4.  Wait for Media Read buffer (1) to complete
      │  5.  Media Read buffer (5)
      │  6.  Data-Shift Read from buffer 1 (transfers in parallel with step 5)
   B  │  7.  Data-Shift Write to buffer 4 (transfers in parallel with step 5)
      │  8.  Wait for Media Read buffer (5) to complete
   C  │  9.  Media Read buffer (6)
      │  10. Wait for Media Read buffer (6) to complete
      │  11. Media Program TLC buffers (2,3,4)
   D  │  12. Data-Shift Read from buffer 5 (transfers in parallel with step 11)
      │  13. Data-Shift Read from buffer 6 (transfers in parallel with step 11)
```

(A) 1. Data-Shift Write to buffer 2
2. Data-Shift Write to buffer 3
3. Data-Shift Write to buffer 4
(B) 4. Media Program TLC buffers (2,3,4)
5. Suspend and Media Read buffer (1)
(C) 6. Wait for Media Read buffer (1) to complete
7. Resume and Media Program buffers (2,3,4)
(D) 8. Data-Shift Read from buffer 1 (transfers in parallel with step 7)

1. Data-Shift Write to buffer 2
2. Media Read buffer (1)
(A) 3. Data-Shift Write to buffer 3 (transfers in parallel with step 2)
4. Wait for Media Read buffer (1) to complete, then Data-Shift Read from buffer (1)
(B) 5. Data-Shift Write to buffer 4
(C) 6. Media Program TLC buffers (2,3,4)

FIG. 3E

EXPLICIT BUFFER CONTROL

FIELD

The present disclosure relates to a memory storage system and methods that utilize specific buffers within a non-volatile semiconductor memory device to control the transfer of data into and out of a memory array.

BACKGROUND

Memory storage systems such as solid-state drives (SSDs) generally have faster performance, are more compact, and are less sensitive to vibration or physical shock than conventional magnetic disk drives. Given these advantages, SSDs are being used in more and more computing devices and other consumer products in lieu of or in addition to magnetic disk drives, even though the cost-per-gigabyte storage capacity of SSDs is significantly higher than that of magnetic disk drives. SSDs utilize physical memory cells that comprise non-volatile semiconductor storage devices, such as NAND flash memory devices, to store data. A controller is used in an SSD to manage the transfer of data between a host and the memory cells of the SSD. Writing data to and reading data from the physical memory cells of an SSD typically involves transferring data between a host external to the SSD and the non-volatile semiconductor storage devices.

SSDs are subject to large volumes of data traffic as they receive multiple read and write requests from the host. Such host requests are in the form of commands that include logical address information, such as logical block addresses (LBAs) and namespace identifiers (NSIDs), which the SSD converts to a physical address (e.g. a NAND memory page address) in the non-volatile semiconductor storage devices. The SSD uses the physical NAND address to fulfil the request (e.g. a read of data from the non-volatile semiconductor storage devices). However the movement of large amounts of data to and from the NAND memory often requires the memory controller to temporarily store the data while the NAND memory device completes its current activities, especially in the case of write commands involving the transfer of data that has yet to be stored.

In such situations, the memory controller uses its internal volatile memory to temporarily store such data. If necessary, external volatile memory is adopted if the size of the internal volatile memory is not sufficient to hold the volume of data being transferred. The use of these resources of the SSD to effectively serve as a buffer or cache memory to manage the transfer of data into and out of the NAND memory device reduces the capabilities of the controller to perform other tasks with such resources. Data may be held in the buffer until the NAND memory device confirms the transfer and/or programming of data has successfully completed, resulting in large amounts of buffer space being allocated and held for long periods of time. Additionally, such internal volatile memories do not scale with the size of the NAND memory device. Thus for high data rates and large data transfers, a large quantity of volatile memory is required, which increases the cost of the SSD, and places additional burdens on the controller and the NAND bus, for example. This imposes challenges on how to efficiently manage read or program/write commands involving large data transfers within a memory storage system.

SUMMARY

According to an embodiment of the present disclosure there is provided a memory storage system comprising a non-volatile semiconductor memory device comprising a memory array and a plurality of buffers. The memory storage system also comprises a controller in communication with the plurality of buffers. The controller is configured to issue a command to the non-volatile semiconductor memory device specifying a subset of n buffers of the plurality of buffers in which to transfer a data payload relating to the command. In some implementations, when the command comprises a data shift-in command, the controller is configured to transfer the data payload from the controller to the subset of n buffers. In certain implementations, the controller is further configured to issue a media write command to cause the non-volatile memory device to store data contained in the subset of n buffers in the memory array. In other implementations, when the command comprises a media read command, the controller is configured to cause the non-volatile memory device to transfer the data payload from the memory array to the subset of n buffers. In certain implementations, the controller is further configured to issue a data shift-out command to transfer the data payload contained in the subset of n buffers to the controller.

According to another embodiment of the present disclosure there is provided a method performed by a controller of a memory storage system comprising a non-volatile semiconductor memory device having a memory array and a plurality of buffers, the controller in communication with the plurality of buffers. The method comprises issuing a command to the non-volatile semiconductor memory device specifying a subset of n buffers of the plurality of buffers in which to transfer a data payload relating to the command. In certain implementations, the method comprises when the command comprises a data shift-in command, transferring the data payload from the controller to the subset of n buffers. In further implementations, the method further comprises issuing a media write command to cause the non-volatile memory device to store data contained in the subset of n buffers in the memory array. In some implementations, the method comprises when the command comprises a media read command, causing the non-volatile memory device to transfer the data payload from the memory array to the subset of n buffers. In further implementations, the method further comprises issuing a data shift-out command to transfer the data payload contained in the subset of n buffers to the controller.

In other implementations, the controller is configured to use a unique buffer identifier for at least one buffer of the subset of n buffers when specifying the subset of n buffers of the plurality of buffers. In some implementations, the controller is configured to issue at least one command at any one time to cause a transfer of the data payload between the subset of n buffers and the memory array. In certain implementations, the non-volatile semiconductor memory device further comprises a subset of internal buffers and a subset of m buffers, both from the plurality of buffers and separate from the n buffers, and the controller is configured to transfer a data payload contained in the subset of m buffers relating to a second command to the internal buffers while a transfer of a data payload between the subset of n buffers and the memory array relating to a first command issued before the second command is being completed. In further implementations, the non-volatile semiconductor memory device further comprises a subset of internal buffers and a subset of m buffers, both from the plurality of buffers and separate from the n buffers, and the controller is configured to suspend the transfer of the data payload between the subset of n buffers and the memory array relating to a first command prior to completion, complete a transfer of a data payload between the subset of m buffers and the memory array relating to a second command, and resume the transfer of the data payload relating to the first command.

In certain implementations, the first command is associated with a first priority value and the second command is associated with a second priority value different to the first priority value, the second priority value being greater than the first priority value. In further implementations, the controller is configured to perform any number of transfers of data payload between the controller and the plurality of buffers in parallel with the transfer of a data payload between the subset of n buffers and the memory array. In certain implementations, the memory storage system comprises memory cells that each store at least one bit per cell. In other implementations, the memory storage system comprises single-level memory cells (SLCs), pseudo single-level memory cell (pSLC), multi-level memory cells (MLCs), triple-level memory cells (TLCs), quad-level memory cells (QLCs), and variable-level memory cells (VLCs), for example. In some implementations, the non-volatile semiconductor memory device is a CMOS Under Array (CUA) NAND semiconductor memory. In further implementations, the controller comprises a system-on-chip (SoC) controller.

Further it should be noted that while the present disclosure has been described for a NAND memory storage device with SLC, pSLC, MLC, TLC, QLC or VLC memory arrays using CuA technology, it will be understood that the systems and methods disclosed herein may be applicable to any memory technology where interface buffers for transferring data in/out of a memory array are employed, such as, but not limited to, CuA NAND memory, non-CuA NAND memory, phase-change memory (PCM), magnetoresistive random-access memory (MRAM), and ferroelectric random-access memory (FeRAM).

BRIEF DESCRIPTION OF DRAWINGS

The foregoing and other objects and advantages will be apparent upon consideration of the following detailed description, taken in conjunction with the accompanying drawings, in which like reference characters refer to like parts throughout, and in which:

FIGS. 3A-3E illustrate exemplary buffer control command sequences issued by the controller of the memory storage system in FIG. 1 to the non-volatile semiconductor memory device in FIG. 2, according to embodiments of the present disclosure.

DETAILED DESCRIPTION

Figure 1:
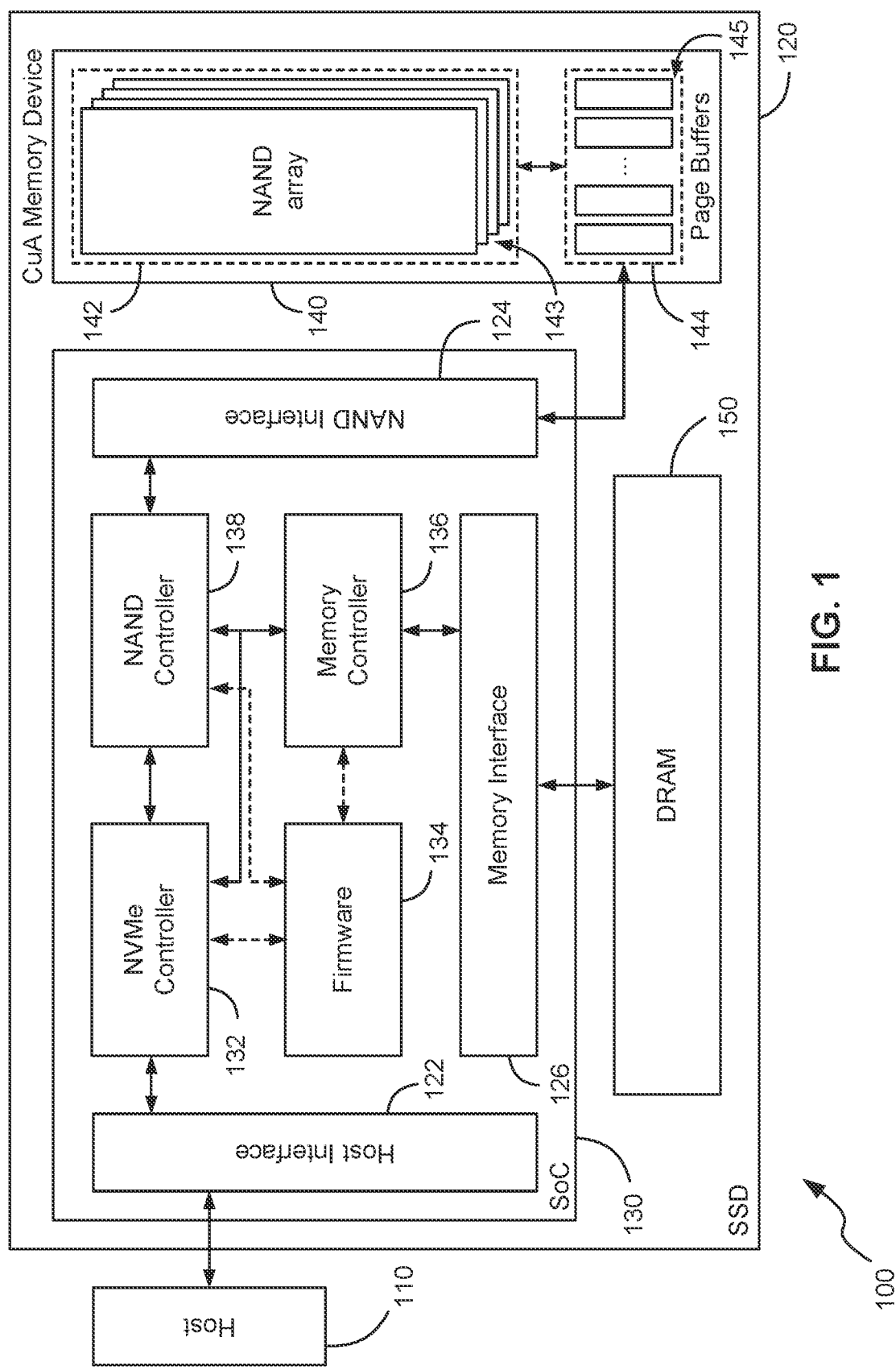
FIG. 1 shows a schematic representation of a memory storage system, such as an SSD, configured according to one or more embodiments of the present disclosure.

To provide an overall understanding of the systems and methods described herein, certain illustrative embodiments will be described. Although the embodiments and features described herein are specifically described for use in connection with a memory storage system, such as an SSD, having a controller and a memory device with page buffers, it will be understood that all the components and other features outlined below may be combined with one another in any suitable manner and may be adapted and applied to other types of memory storage system architectures with memories having a similar need to efficiently manage commands involving large data transfers into and out of the memory storage system.

Three dimensional (3D) NAND arrays have recently been attracting attention as they offer increased data handling capabilities due to the vertical stacking of NAND planes resulting in a compact footprint. Memory devices incorporating 3D NAND memory arrays are fast, more efficient and consume less energy than conventional NAND memory arrays. More recent generations of the 3D NAND memory arrays build a vertical stack of NAND memory array layers on top of the interface, command and control logic circuitry of the NAND chip, instead of placing that circuitry on the periphery of the NAND memory array, which requires a larger die area than the NAND memory array occupies alone. In some instances, such interface, command and control circuitry utilizes complementary metal-oxide-semiconductor (CMOS) technology resulting in a CMOS under Array (CuA) NAND memory device. This enhanced memory architecture provides a CuA NAND array with approximately 25% more die per wafer relative to a 64-layer 3D NAND array. The CMOS logic circuitry also facilitates optimization of the NAND architecture by potentially adding a large number of NAND page buffers in the CMOS area of a CuA NAND memory device, compared to a limited size of buffer space offered by circuitry placed at the periphery. The size is limited in order to constrain the overall die size, so the amount of circuitry placed on the periphery is kept to a minimum, which limits, for example, the number of buffers or the amount of buffer space the memory device can offer. If the buffers are implemented in a CuA manner, the number of NAND page buffers could scale with the size of the NAND memory, where the NAND page buffers could be configured for homogeneous use, being repurposed as necessary to suit the requirements of the memory storage system. In some implementations where CuA technology is not used, the systems and methods described in the present disclosure may still be employed when multiple NAND page buffers are available. The availability of NAND page buffers within the CuA NAND memory device would alleviate the burden placed on the volatile memory of the memory controller when processing commands involving large data transfers. However the management and control of such a large number of NAND page buffers imposes challenges on how to efficiently manage data transfer within the memory storage system.

The present disclosure describes systems and methods to address the aforementioned challenges and improve the efficiency in which an SSD program/write and read commands cause the transfer of data payloads to and from memory devices, such as, for example NAND memory devices including CuA NAND memory devices. The present disclosure describes a controller implemented scheme for controlling data transfer within a NAND memory device in which the controller issues a command to the memory device, the command explicitly identifying a subset of n NAND page buffers of a plurality of NAND page buffers within the NAND memory device in which to transfer a data payload relating to the command. When the command comprises a data shift-in command, the controller is configured to transfer the data payload to the subset of n NAND page buffers. Once the data shift-in operation is complete, the controller may be further configured to issue a media write or program command to cause the non-volatile memory device to store data contained in the subset of n NAND page buffers in the NAND memory array. When the command comprises a media read command, the controller is configured to cause the non-volatile memory device to transfer the data payload from the NAND memory array to the subset of n NAND page buffers. Once the media read operation is complete, the controller may be further configured to issue a data shift-out command to transfer the data payload contained in the subset of n NAND page buffers to the controller. In doing so, the controller effectively controls data transfers to and from the NAND memory array by handling data shift operations between the controller and the page buffers separately from media operations between the page buffers and the memory array.

By utilizing the NAND page buffers of the NAND memory device in this manner, the burden place by the controller on its internal volatile memory (or adopt additional external volatile memory) is reduced when processing commands involving large data payloads. This is because the CuA NAND memory device has an increased number of buffers in which to store data payloads for multiple commands, such that even while media write/program commands may still be pending and the buffers used by the command are still in use, other buffers may still be available into which subsequent shift-in/out commands may place data. Further, should the media command fail, the command may be re-issued and re-use the buffers still containing the shift-in data, while still allowing other commands using other buffers to proceed. The requirement to retain the shift-in data in host buffers and to re-issue shift-in data commands is removed. This allows the SSD to buffer increased amounts of data within the CuA NAND memory device itself, thereby improving NAND bus and die utilization. Additionally, as the NAND page buffers are contained within the interface, command and control circuitry located under the memory array, the number of NAND page buffers scales with the number of NAND dies. Further, the separation of data shift operation and media operation simplifies implementation of the controller based scheme of the present disclosure.

As previously mentioned, the NAND page buffers are homogeneous buffers which can be used for any number of processes such as data shift-in write commands, data shift-out read commands, media program/write commands and media read commands. In some implementations where heterogeneous buffers are employed, a controller may be required to obey the restrictions and special requirements of individual buffers, but in all other aspects the systems and methods described in the present disclosure may still be employed. The flexibility afforded by the NAND page buffers therefore makes managing them simpler as there are few individual characteristics and restrictions to consider. The SSD controller and associated firmware has a queue of several read/write requests and can therefore manage and optimize the usage of the multiple NAND page buffers and the CuA memory array with greater accuracy. This is achieved by allocating commands to specific NAND page buffers via NAND page buffer identifiers and a NAND page buffer status table, for example. This allows the controller to control which NAND page buffers are used, and permits flexible management of a larger pool of buffers, especially when the CuA NAND device scales up in size.

FIG. 1 is a block diagram of a computing system 100 comprising at least one host 110 in communication with a solid-state device (SSD) 120, according to an embodiment of the present disclosure. The host 110 is a computing system that comprises processors or cores, a controller, a memory, and other components as is generally known in the art, and which are not shown in FIG. 1 for the sake of brevity. SSD 120 provides non-volatile storage functionality for use by the host 110. SSD 120 may include an integrated circuit comprising a controller. Such an integrated circuit may also be referred to as a system-on-chip (SoC) controller 130. SoCs are advantageous in SSDs as they provide a single integrated circuit that contains all the required circuitry and components of the electronic system required for the SSD to function. The SoC therefore eliminates the need for a modular discrete component architecture connected by a plurality of busses and buffers.

SoC controller 130 is communicatively coupled to a non-volatile semiconductor-based storage device 140 (while a single device is shown for clarity, there may be a whole array of devices which the controller 130 is communicatively coupled to, such as NAND-based flash memory devices) as the storage medium. The storage medium may comprise a plurality of NAND devices, such as, for example, 32, 64, 128, 256 separate NAND devices, and each NAND device can be running separate commands on planes of individual dies (not shown) within the device. As an example, an array of storage device 140 comprising x NAND devices each with y dies may be servicing up to (x×y) commands from the SoC controller 130 at any one time, where x and y are integers greater than zero. According to an embodiment of the present disclosure, non-volatile semiconductor-based storage device 140 may comprise a three-dimensional (3D) NAND device such as a complementary metal-oxide-semiconductor (CMOS) under array (CuA) memory device, as will be described in further detail below. Generally, a CuA memory device comprises a memory array 142 of NAND planes 143 built vertically over the interface, command and control circuitry 144 for the storage device 140. In some implementations, the interface, command and control circuitry 144 may comprise a plurality of homogenous NAND page buffers 145 that can be used for multiple purposes associated with the NAND array 142.

It should be noted that the present disclosure applies to memory cells having any structure, such as, for example, single-level memory cell (SLC), pseudo single-level memory cell (pSLC), multi-level memory cell (MLC), triple-level memory cell (TLC), quad-level memory cell (QLC), or variable-level memory cell (VLC). Further, while the present disclosure has been described for a NAND memory storage device with SLC, pSLC, MLC, TLC, QLC or VLC memory arrays using CuA technology, it will be understood that the systems and methods disclosed herein may be applicable to any memory technology where interface buffers for transferring data in/out of a memory array are employed, such as, but not limited to, CuA NAND memory, non-CuA NAND memory, phase-change memory (PCM), magnetoresistive random-access memory (MRAM), and ferroelectric random-access memory (FeRAM).

SSD 120 also includes a volatile memory external to the SoC controller 130, such as a dynamic random access memory ("DRAM") 150. DRAM 150 comprises several buffers (not shown) which are conventionally used to buffer data during read and write operations between the host 110 and the storage devices 140 upon receipt of commands from the host 110. It should be noted that unlike the NAND page buffers 145 in the storage device 140, the DRAM 150 memory can be flexibly allocated and de-allocated for whatever buffering or temporary storage purpose the controller 130 requires.

Volatile memories are used in connection with the controller as they are fast and responsive. However the contents stored in volatile memories are lost when power is removed. Volatile memories are also expensive, and thus increase the overall cost of the SSD. In some implementations, the whole or a part of the external memory DRAM 150 may be located within the SoC controller 130. When located within the SoC controller 130, at least a portion of the external memory may be implemented using a fast memory technology, such as static random access memory (SRAM). In some implementations, the portion of the DRAM located within the SoC 130 may be implemented as a cache. In certain implementations the whole or a part of the external memory may be implemented using a fast non-volatile memory technology, including, but not limited to, magnetic random access memory (MRAM), resistive random access memory (Re-RAM) or phase change memory (PCM).

SoC controller 130 comprises a host interface 122 which enables communication with the host 110 for the receipt of commands such as read and write requests, for example. SoC controller 130 also includes a NAND interface 124 for communication with the storage device 140 via a NAND bus coupled to the interface, command and control CuA circuitry 144 comprising the page buffers 145 of the NAND array 142. Further, the SoC controller 130 comprises a (DRAM) memory interface 126 for communication with the memory 150 external to the SoC. Host interface 122 on the SoC 130 may comprise a Serial Advanced Technology Attachment (SATA) connector or a NVMe™ connector (NVMe™ is an acronym for "NVM express," where "NVM" stands for non-volatile memory, hereinafter NVMe) operating with a PCIe® ("Peripheral Component Interface Express," hereinafter PCIe) bus, for example. NAND interface 124 may comprise an Open NAND Flash Interface (ONFI), a toggle NAND interface or a manufacturer's proprietary interface, for example. Memory interface 126 may comprise, for example, an interface according to, but not limited to: a Double Data Rate (DDR) memory bus standard such as DDR3, DDR4 or DDR5; a Low Power Double Data rate (LPDDR) memory bus standard such as LPDDR3, LPDDR4 or LPDDR5; a Hybrid Memory Cube (HMC) memory bus standard.

SoC controller 130 may comprise various internal sub-controllers such as a NVMe controller 132 coupled to the host interface 122, a memory controller 136 coupled to the memory interface 126, and a NAND controller 138 coupled to the NAND interface 124. The NVMe controller 132 may be configured to function in accordance with the NVM Express™ Base Specification (version 1.4) dated Jun. 10, 2019, hereinafter referenced as "NVMe 1.4." The NVMe controller 132 and NAND controller 138 may also be coupled to the memory controller 136 via a data bus. Firmware 134, in which various operational parameters for the SSD 120 may be stored or programmed, may be used to control the operation of, and transfer of data between, the NVMe controller 132, NAND controller 138 and memory controller 136. The firmware 134 may comprise application specific integrated circuit (ASIC) logic that is programmable, programmable firmware running on one or more processors or a combination of both. The firmware 134 may comprise a flash translation layer that enables the SoC controller 130 to perform various activities that facilitate the processing of read and write commands received from the host 110. One such activity may include the orchestration of the data flow for the commands between the NVMe controller 132 and the NAND controller 138. With respect to FIG. 1, the firmware configuration circuit 134 configures and controls the operation and the passing of data between these controllers 132, 136, 138. The NVMe controller 132, memory controller 136, and NAND controller 138 are interconnected by a common bus and controlled by the firmware configuration function circuit 134. Memory controller 136 is connected to the DRAM 150 via the memory interface 126. NAND controller 138 is connected to the NAND interface 124 for communication with the storage device 140, as is shown in FIG. 1. Any interaction between the SoC 130 and the NAND array 142 occurs via the NAND controller 138, the NAND interface 124, and the NAND page buffers 145.

Once the NVMe controller 132 receives commands from the host 110, such as read commands or write commands, for example, it utilizes the settings in the firmware 134 to map the logical block addresses contained in the host commands to physical NAND addresses. The firmware 134 may utilize a look-up table to obtain the required NAND addresses. These NAND addresses are then used in NAND commands, either based on the host commands received or internally generated by firmware, which are sent to the NAND controller 138. In the case of a CuA NAND memory, the NAND controller 138 determines a specific subset of n buffers from the plurality of NAND page buffers 145 available in the interface, command and control CMOS circuit 144 of the memory device 140 for use when processing a command, where n is an integer greater than zero. In some implementations, each of the NAND page buffers 145 have a unique buffer identifier, which the SoC 130 explicitly specifies when processing a command. The NAND controller 138 then uses the NAND addresses to perform an action or function on the memory device 140, as defined by the host or internally generated commands (e.g. garbage collections commands).

Figure 2:
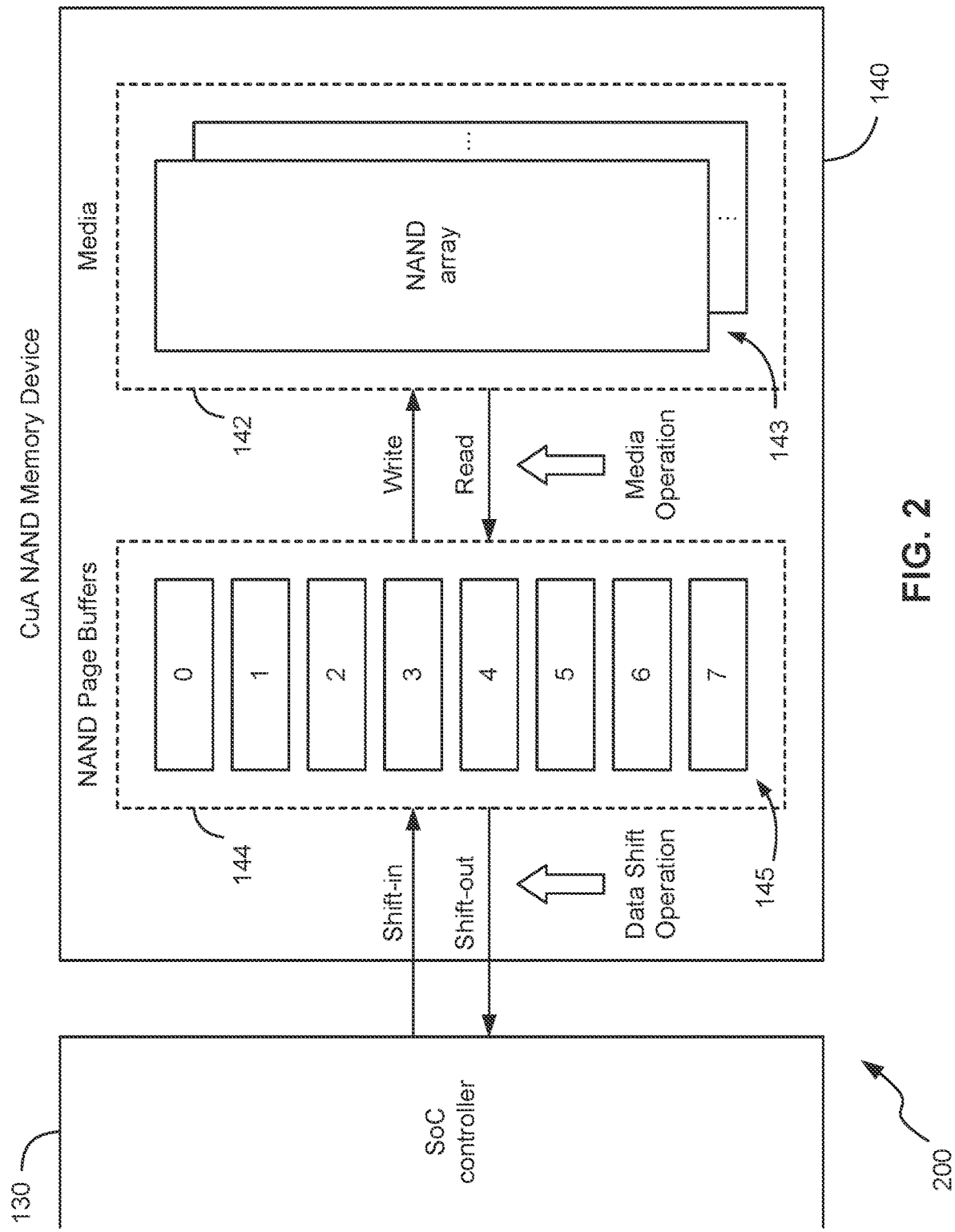
FIG. 2 illustrates the interaction between the controller of the memory storage system in FIG. 1 and a non-volatile semiconductor memory device having a memory array and a plurality of buffers, according to one or more embodiments of the present disclosure.

FIG. 2 shows a setup 200 to illustrate the interaction between the SoC controller 130 and the memory device 140 when processing a command, according to an embodiment of the present disclosure. When processing commands, the SoC controller 130 issues commands to the memory device 140 to cause a data shift operation between the SoC controller 130 and the NAND page buffers 145, and commands to the memory device 140 to cause a media operation between the memory array 142 and the NAND page buffers 145. Media operations may be performed in parallel with data shift operations. In some implementations, only one media operation is performed at any one time, while any number of data shift operations can occur provided there are sufficient page buffers 145 available in the memory device 140. This is because the time taken to complete a media operation is generally longer than the time taken to complete a data shift operation. For example, a write or program media operation typically takes about two milliseconds, whereas a data shift operation typically takes a few microseconds.

The order of operations performed within the memory device 140 upon receipt of a command from the SoC controller 130 depends on the nature of the command being processed. For example, in the case of a read command received from the host 110, the NAND controller 138 issues one or more read commands to cause one or more media read operations from one or more NAND physical addresses corresponding to one or more logical addresses specified in the read command. Here the NAND controller 138 specifies n NAND page buffers 145 into which a data payload contained at the specified NAND physical address in the NAND array 142 is to be transferred. While a media read operation is being performed between the memory array 142 and the n NAND page buffers 145, the memory device 140 may also perform, in parallel, data shift operations between the SoC controller 130 and the NAND page buffers 145 related to other command received from the SoC controller 130. Once the one or more media read operations are complete, the NAND controller 138 issues a data shift-out command from the n NAND page buffers containing the data payload related to the one or more read commands from the SoC controller 130 for delivery to the SoC controller 130. As with a media read operation, while the data shift-out operation is being performed between the n NAND page buffers 145 and the SoC controller 130, the memory device 140 may also perform, in parallel, media operations between the NAND page buffers 145 and the NAND array 142, related to other commands received from the SoC controller 130.

As another example, in the case of a write command, the NAND controller 138 issues a data shift-in command to transfer a data payload from the SoC controller 130 to the memory device 40. Here the NAND controller 138 specifies n NAND page buffers 145 into which the data payload from the SoC controller 130 is to be transferred. While the data shift-in operation is being performed between the n NAND page buffers 145 and the SoC controller 130, the memory device 140 may also perform, in parallel, media operations between the NAND page buffers 145 and the NAND array 142 related to other commands received from the SoC controller 130. Once the data shift-in operation is complete, the NAND controller 138 issues a command to cause a media write/program operation from the n NAND page buffers 145 containing the data payload to the NAND physical address specified in the write command. As with the data shift-in operation, while the media write operation is being performed between the n NAND page buffers 145 and the NAND array 142, the memory device 140 may perform, in parallel, data shift operations between the SoC controller 130 and the NAND page buffers 145 related to other command received from the SoC controller 130.

FIGS. 3A-3E illustrate exemplary buffer control command sequences 300, 310, 320, 330, 340 issued by the NAND controller 138 to perform various actions on the CuA NAND memory device 140, having the configuration as depicted in FIGS. 1-2, according to various embodiments of the present disclosure. FIGS. 3A-3E have been exemplified with a CuA NAND memory device 140 having a triple-layer memory cell (TLC) structure, however the present disclosure is not limited to a TLC memory cell structure. Rather, the present disclosure could be applied to a NAND memory device (e.g. a CuA NAND device) with multiple NAND page buffers and having any memory cell structure such as, for example, single-level memory cell (SLC), pseudo single-level memory cell (pSLC), multi-level memory cell (MLC), triple-level memory cell (TLC), quad-level memory cell (QLC), or variable-level memory cell (VLC). In each of FIGS. 3A-3E the SoC controller commands are consolidated in alphabetized groups, where the commands within each alphabetized group may be performed together.

FIG. 3A provides an exemplary command sequence 300 for a program/write or cache program/write operation, according to an embodiment of the present disclosure. Here the SoC controller 130 issues a data shift-in write operation in command lines 1-3 where a data payload is transferred to NAND page buffers 4, 5, 6. The NAND controller 138 may select specific NAND page buffers from a page buffer identifier. In some implementations, the NAND controller 138 may maintain an active table of NAND page buffers with a status indication to determine if any one NAND page buffer is available for the receipt of data, whether from the SoC controller 130 or from a physical location in the NAND memory array 142. Note that the exemplary command sequence in FIGS. 3A-3E are with respect to a TLC memory cell structure, and so a write operation will have to contain data payload for the three NAND pages of the TLC cell (upper page, middle page and lower page), hence the transfer to three NAND page buffers in command lines 1-3. Once the data payload for all TLC pages has been transferred to the NAND page buffers 4, 5, 6, the NAND controller 138 issues a media program/write command in command line 4 where the data payload contained in NAND page buffers 4, 5, 6 is stored in the NAND array 142, at the physical address as specified in the write command. In parallel with the media program/write command in command line 4, the SoC controller 130 may also start to issue data shift-in commands in command lines 5-7 while the media program/write command in command line 4 is being executed. Data shift-in commands in command lines 5-7 relate to a subsequent write command where a payload is transferred to available NAND page buffers, such as NAND page buffers 0, 3, 7. In effect the command lines 5-7 function as a cache write while the current media write program in command line 4 is being executed.

As previously mentioned, a media program command typically takes about two milliseconds to complete while a data shift command typically takes a few tens of microseconds to complete. Thus even after the data shift-in commands in command lines 5-7 have completed, the controller 130 may still have to wait for the media write command in command line 4 to complete before proceeding with a subsequent media program operation, per command line 8. During this wait time, the SoC controller 130 could cache more data payloads by performing other data shift operations between the SoC controller 130 and any available NAND page buffers 145.

In some implementations, the SoC controller 130 may designate a plurality of NAND page buffers 145 as internal or private buffers separate from NAND page buffers 0-8 as shown in FIG. 2, which may be used to store the data payload in NAND page buffers 0, 7, 3. In this manner, NAND page buffers 0, 7, 3 can be cleared for use in yet another data shift operations while the media write command in command line 4 is completed. If no internal buffers are available for use, the SoC controller 130 maintains the data in the NAND page buffers 0, 7, 3 without clearing them until the NAND array 142 is available for media program/write.

When the media write command in command line 4 has completed, the NAND controller 138 issues a media program/write command in command line 9 where the data payload contained in NAND page buffers 0, 3, 7 is stored in the NAND array 142, at the physical address as specified in the write command. In keeping with the above disclosure, in parallel with the media program command in command line 9, the SoC controller 130 may also perform other data shift operations between the SoC controller 130 and any available NAND page buffers 145 while the media program command in command line 9 is being executed.

FIG. 3B provides an exemplary command sequence 320 for a read or cache read operation, according to an embodiment of the present disclosure. Here the SoC controller 130 issues a media read command in command line 1 where a data payload stored at a physical address in the NAND array 142 as specified in the read command from the host 110 is transferred to a NAND page buffer 145. In the media read command, the NAND controller 138 specifies that the data payload is to be transferred to NAND page buffer 1, which the NAND controller 138 has determined as being available for use. The media read command typically takes about a few tens of microseconds to complete, and so the SoC controller 130 waits for the data payload in relation to the media read operation in command line 1 to be fully transferred to NAND page buffer 1 in command line 2. Although not specified in command sequence 310, during this wait time, the SoC controller 130 could cache data payloads relating to other commands by performing data shift operations between the SoC controller 130 and any available NAND page buffers 145.

Once the media read to NAND page buffer 1 has completed, the SoC controller 130 issues a command for the next media operation, such as a media read to NAND page buffer 3, per command line 3. Again, the media read is for a data payload stored at a physical address in the NAND array 142 corresponding to a logical address specified in a read command from the host 110, and the NAND controller 138 specifies that the data payload is to be transferred to NAND page buffer 3, which the NAND controller 138 has determined as being available for use. In parallel with the media operation as specified in command line 3, the SoC controller 130 also issues a data shift read command from NAND page buffer 1 in command line 4 to transfer the data payload contained therein to the SoC controller 130 for delivery to the host 110 so as to complete the host read command which caused the media read operation in command line 1. In effect the command line 3 functions as a cache read while the read command in relation to the data payload contained in NAND page buffer 1 is being executed. The SoC controller 130 then waits for the data payload in relation to the media read operation in command line 3 to be fully transferred to NAND page buffer 3 in command line 5. Once the media read to NAND page buffer 3 has completed, the SoC controller 130 issues a data shift-out read command from NAND page buffer 3 in command line 6 to transfer the data payload contained therein to the SoC controller 130 for delivery to the host 110 so as to complete the host read command which caused the media read operation in command line 3.

FIG. 3C provides an exemplary command sequence 330 for mixed program/write and read media operations, according to an embodiment of the present disclosure. The SoC controller 130 issues a media read command in command line 1 where a data payload stored at a physical address in the NAND array 142 corresponding to a logical address specified in the read command from the host 110 is transferred to a NAND page buffer 145. In the media read command, the NAND controller 138 specifies that the data payload is to be transferred to NAND page buffer 1, which the NAND controller 138 has determined as being available for use. The SoC controller 130 also issues data shift-in write operation in command lines 2-3 where a data payload is transferred to NAND page buffers 2, 3. The NAND controller 138 may select specific NAND page buffers from a page buffer identifier. Command lines 2 and 3 may be performed in parallel with command line 1. The SoC controller 130 then waits for the data payload in relation to the media read operation in command line 1 to be fully transferred to NAND page buffer 1 in command line 4.

Next the SoC controller 130 issues a media read command in command line 5 where a data payload stored at a physical address in the NAND array 142 as specified in a read command is transferred to a NAND page buffer 5, which the NAND controller 138 has determined as being available for use. The SoC controller 130 also issues a data shift-out read operation in command line 6 where the data payload contained in NAND page buffer 1 from the media read operation caused by command line 1 is transferred to the SoC controller 130 for delivery to the host 110. The SoC controller 130 issues data shift-in write operation in command line 7 where a data payload is transferred to NAND page buffer 4. Command lines 6 and 7 may be performed in parallel with command line 5. The SoC controller 130 then waits for the data payload in relation to the media read operation in command line 5 to be fully transferred to NAND page buffer 1 in command line 8. Once the data payload in relation to the media read command in command line 5 has been transferred to NAND page buffer 5, the SoC controller 130 issues another media read command in command line 9 where a data payload stored at a physical address in the NAND array 142 as specified in a read command is transferred to a NAND page buffer 6, which the NAND controller 138 has determined as being available for use, after which the SoC controller 130 waits for completion of the data payload received in NAND page buffer 6 from the NAND array 142 (command line 10).

Now that the payload for the write command has been transferred to NAND buffer pages 2, 3, 4 from the data shift-in write commands in command lines 2, 3, 7, albeit with interruption from other operations, the NAND controller 138 issues a media program/write command in command line 11 where the data payload contained in NAND page buffers 2, 3, 4 is stored in the NAND array 142, at the physical address as specified in the write command. In parallel with the media program/write command, the SoC controller 130 also issues data shift-out read commands in command lines 12, 13 while the media program/write command in command line 11 is being executed. Data shift-out commands in command lines 12, 13 transfer the data payload contained in NAND page buffers 5 and 6 (both caused by the previous media read operations in command lines 5 and 9) to the SoC controller 130. Command lines 12 and 13 may be performed in parallel with command line 10. FIG. 3C exemplifies how the CuA NAND memory device 140 handles mixed program/write and read media operations.

FIG. 3D provides an exemplary command sequence 330 for a program suspend operation, with data payload always available on read back, according to an embodiment of the present disclosure. In command lines 1-3, the SoC controller 130 issues a data shift-in write operation where a data payload is transferred to NAND page buffers 2, 3, 4, which the NAND controller 138 has determined are available for use. Once the data payload for all TLC pages has been transferred to the NAND page buffers 2, 3, 4, the NAND controller 138 issues a media program/write command in command line 4 where the data payload contained in NAND page buffers 2, 3, 4 is stored in the NAND array 142, at the physical address as specified in the write command.

However, while processing the media program/write command, the SoC controller 130 issues a suspend command in lieu of a media read command in command line 5. As previously mentioned, only one media operation may be performed on the NAND array 142 at any one time. Further, a read command from a host 110 is generally deemed to be of higher importance than a write command as the host 110 will not be able to proceed with its operations without the requested data payload from the NAND array 142. This is the reason for suspending the less important media write command in command line 4 to give way to the media read command in command line 5.

The SoC controller 130 issues the media read command in command line 5 where a data payload stored at a physical address in the NAND array 142 corresponding to a logical address specified in the read command from the host 110 is transferred to NAND page buffer 1, which the NAND controller 138 has determined as being available for use. The SoC controller 130 then waits for the media read to NAND page buffer 1 to complete, per command line 6. Once the data payload has been transferred to NAND page buffer 1, the SoC controller 130 resumes the media program/write command where the storage of the data payload in NAND page buffers 2, 3, 4 at the physical address as specified in the write command is resumed, in command line 7. In parallel with the media program/write command in command line 7, the SoC controller 130 issues a data shift-out read command in command line 8 while the media program/write command in command line 7 is being executed. The data shift-out command in command line 8 transfers the data payload contained in NAND page buffer 1 (caused by the previous media read operation in command line 6) to the SoC controller 130. FIG. 3D exemplifies how the CuA NAND memory device 140 can be used to suspend operations and prioritize the processing of a read command over a write command.

In some implementations, the SoC controller 130 may designate a plurality of NAND page buffers 145 as internal or private buffers separate from NAND page buffers 0-8 as shown in FIG. 2, which may be used to store the data payload in NAND page buffers 2, 3, 4 as used in command line 4. In this manner, NAND page buffers 2, 3, 4 can be cleared for use in other data shift operations while the media read command in command line 5 is being completed. If no internal buffers are available for use, the SoC controller 130 maintains the data in the NAND page buffers 2, 3, 4 without clearing them until the NAND array 142 is available to resume the media program/write in command line 7.

FIG. 3E provides an exemplary command sequence 340 for prioritizing Read operations between data shift-in of the pages for a program without the need for a suspend operation, according to an embodiment of the present disclosure. The SoC controller 130 issues a data shift-in write operation at command line 1 where a data payload is transferred to NAND page buffer 2 which the NAND controller 138 has determined is available for use. A read operation can be started without waiting for the data shift-in of all the pages of a program operation. In this example, after the first page data-in, the SoC controller 130 issues a media read command in command line 2 where a data payload stored at a physical address in the NAND array 142 as specified in the read command from the host 110 is transferred to NAND page buffer 1, which the NAND controller 138 has determined as also being available for use.

The SoC controller 130 also issues a data shift-in write command to transfer a data payload to NAND buffer 3 in command line 3, which can be done in parallel to the read media operation of command line 2. Next, in command line 4, the SoC controller checks that the media read in command line 2 completes and then issues a command for the data shift-out read from buffer 1 to the controller 130. In command line 5, the SoC controller issues a command for the data shift-in write to transfer a data payload to NAND buffer 4. Note that the data shift-out read operation from NAND buffer 1 in command line 4 is inserted in between the data shift-in read operations in command lines 3 and 5.

Once the data payload for all TLC pages have been transferred to the NAND page buffers 2, 3, 4 via command lines 1, 3, 5, the NAND controller 138 issues a media program/write command in command line 6 where the data payload contained in NAND page buffers 2, 3, 4 is stored in the NAND array 142, at the physical address as specified in the write command. FIG. 3E does away with the suspend operation by changing the order of media operation where a media read operation occurs before a media program/write operation.

Figure 4:
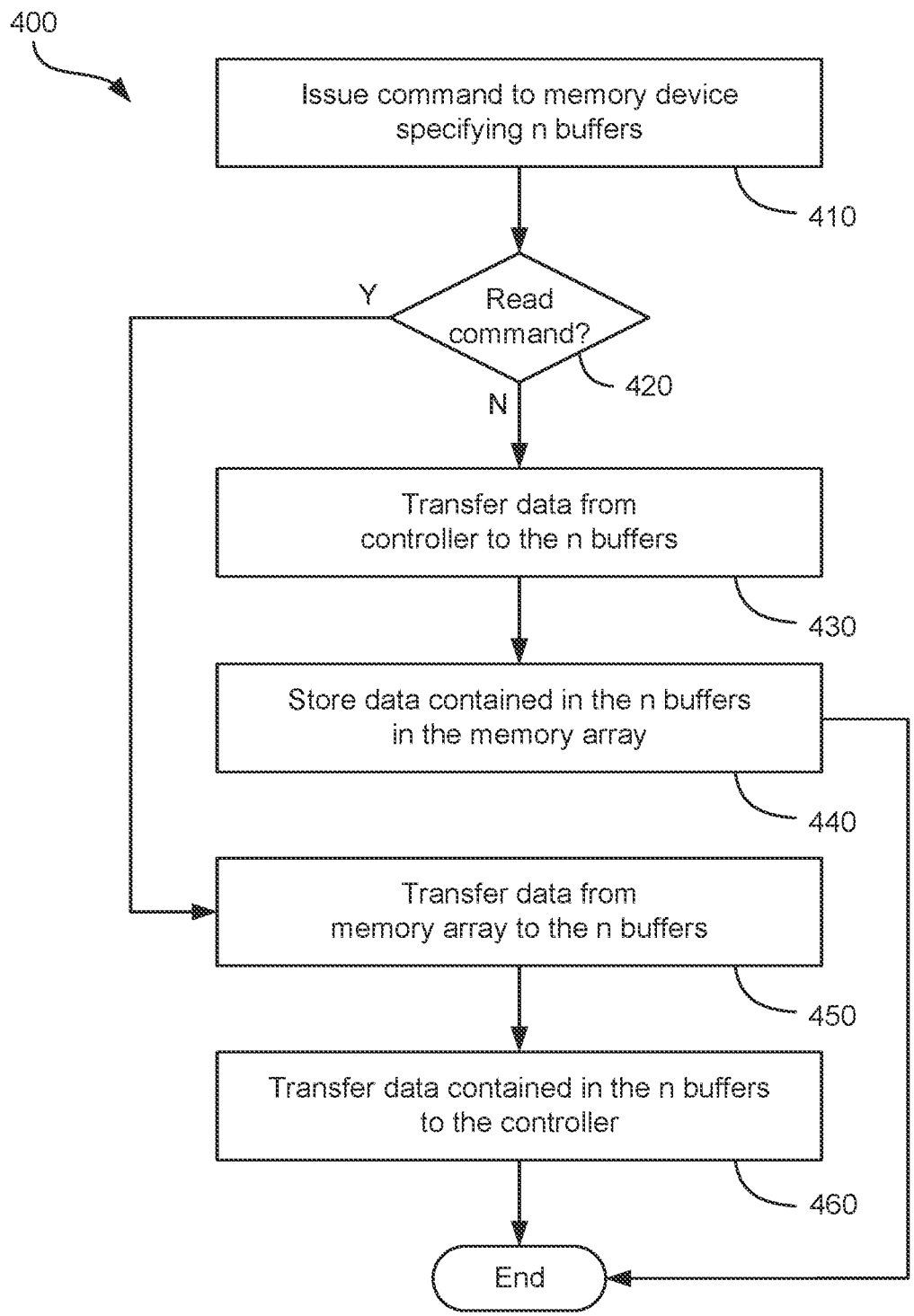
FIG. 4 is a flow diagram of a method for transferring data into and out of a non-volatile semiconductor memory device having a multiple page buffers using explicit buffer control, according to one or more embodiments of the present disclosure.

FIG. 4 illustrates an exemplary flow diagram of a method 400 for transferring data into and out of a CMOS Under Array (CuA) non-volatile semiconductor memory device 140 using explicit buffer control, according to an embodiment of the present disclosure. The method may be carried out by a SoC controller 130 of an SSD 120, as described in the foregoing in relation to FIG. 1. The SoC controller 130 generates NAND commands, either based on commands received from a host 110 or commands internally generated by firmware (e.g. garbage collection), which are sent to the NAND controller 138. The method begins at step 410 where the SoC controller 130 issues a command to the non-volatile semiconductor memory device 140 relating to the transfer of a data payload to and from the memory device 140. In some implementations, the NAND controller 138 in the SoC controller 130 specifically identifies n NAND page buffers 145 in the memory device 140 in which to transfer a data payload relating to the command. In some implementations, the NAND page buffers 145 are identified by a unique buffer identifier known to the NAND controller 138.

Next in step 420 the method determines if the command from the SoC controller 130 comprises a program/write command or a read command. If the command comprises a program/write command, i.e. 'N' at step 420, the SoC controller 130 transfers a data payload via a shift-in write operation from the SoC controller 130 to a subset of n NAND page buffers 145, per step 430. Next in step 440, the SoC controller 130 issues a media program/write command to cause the NAND memory device 142 to store the data payload contained in the subset of n NAND page buffers in the memory array 142, at the NAND physical address as specified in the originating write command. In some implementations, step 440 may be omitted or performed at some later time, for example in the event that higher priority commands such as read commands are required to be executed first. If the command comprises a read command, i.e. 'Y' at step 420, the SoC controller 130 causes the transfer of a data payload stored at the NAND physical address in the NAND array 142, as specified in the originating read command from the host 110, to a subset of n NAND page buffers 145, per step 450. Next in step 460, the SoC controller 130 transfers the data payload via a data shift-out read operation from the subset of n NAND page buffers 145 to the SoC controller 130 for delivery to host 110. In some implementations, step 460 may be omitted or performed at some later time.

In the foregoing, all recitation of "layer" and "engine" should be taken to mean a plurality of circuits within the controller that facilitates the function as described. Such circuits may comprise electronic components formed on a semiconductor chip, such as, for example, transistors and resistors. It should be noted that the term "about" or "approximately" in the foregoing indicates a range of ±20% of the stated value. Additionally, in the foregoing, all recitation of "command," "action" or "function" should be taken to be based on algorithms and instructions stored on a non-transitory computer-readable medium, that, when executed by a processor, causes a controller of an integrated circuit of a solid-stated drive (SSD) to perform the command, action or function. Further, in the foregoing, the terms "write" and "program" may be used interchangeably in relation to command, and both relate to the function of transferring a data payload to a specific physical address in a memory device. In relation to the above disclosure, memory arrays comprise memory cells that each store n bits per cell, where n is any integer. For example, for single-level memory cells (SLCs), n=1, for multi-level memory cells (MLCs), n=2, for triple-level memory cells (TLCs), n=3, for quad-level memory cells (QLCs), n=4, and for variable-level memory cells (VLCs), n=5.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. A memory storage system comprising:
a non-volatile semiconductor memory device comprising a memory array and a plurality of buffers; and
a controller in communication with the plurality of buffers, and configured to issue a command to the non-volatile semiconductor memory device specifying a subset of n buffers of the plurality of buffers in which to transfer a data payload relating to the command,
the plurality of buffers further comprising a subset of internal buffers and a subset of m buffers, both separate from the subset of n buffers, and the controller is further configured to transfer of a data payload between the subset of n buffers and the memory array relating to a first command, and transfer a data payload contained in the subset of m buffers relating to a second command issued after the first command to the internal buffers while the transfer of the data payload relating to the first command is being completed.

2. The memory storage system of claim 1, wherein when the command comprises a data shift-in command, the controller is configured to transfer the data payload from the controller to the subset of n buffers.

3. The memory storage system of claim 2, wherein the controller is further configured to issue a media write command to cause the non-volatile memory device to store data contained in the subset of n buffers in the memory array.

4. The memory storage system of claim 1, wherein when the command comprises a media read command, the controller is configured to cause the non-volatile memory device to transfer the data payload from the memory array to the subset of n buffers.

5. The memory storage system of claim 4, wherein the controller is further configured to issue a data shift-out command to transfer the data payload contained in the subset of n buffers to the controller.

6. The memory storage system of claim 1, wherein the controller is configured to use a unique buffer identifier for at least one buffer of the subset of n buffers when specifying the subset of n buffers of the plurality of buffers.

7. The memory storage system of claim 1, wherein the controller is configured to issue at least one command at any one time to cause a transfer of the data payload between the subset of n buffers and the memory array.

8. The memory storage system of claim 1, wherein the controller is configured to suspend the transfer of the data payload between the subset of n buffers and the memory array relating to the first command prior to completion, complete a transfer of a data payload between the subset of m buffers and the memory array relating to the second command, and resume the transfer of the data payload relating to the first command.

9. The memory storage system of claim 8, wherein the first command is associated with a first priority value and the second command is associated with a second priority value different to the first priority value, the second priority value being greater than the first priority value.

10. The memory storage system of claim 1, wherein the controller is configured to perform any number of transfers of data payload between the controller and the plurality of buffers in parallel with the transfer of a data payload between the subset of n buffers and the memory array.

11. The memory storage system of claim 1, wherein the memory storage system comprises memory cells that each store at least one bit per cell.

12. The memory storage system of claim 11, wherein the memory storage system comprises single-level memory cells (SLCs), pseudo single-level memory cells (pSLC), multi-level memory cells (MLCs), triple-level memory cells (TLCs), quad-level memory cells (QLCs) and variable-level memory cells (VLCs).

13. The memory storage system of claim 1, wherein the non-volatile semiconductor memory device is a CMOS Under Array (CUA) NAND semiconductor memory.

14. The memory storage system of claim 1, wherein the controller comprises a system-on-chip (SoC) controller.

15. A method performed by a controller of a memory storage system comprising a non-volatile semiconductor memory device having a memory array and a plurality of buffers, the controller in communication with the plurality of buffers, the method comprising:
issuing a command to the non-volatile semiconductor memory device specifying a subset of n buffers of the plurality of buffers in which to transfer a data payload relating to the command,
transferring a data payload between the subset of n buffers and the memory array relating to a first command, and
transferring a data payload contained in a subset of m buffers relating to a second command issued after the first command to a subset of internal buffers while the transfer of the data payload relating to the first command is being completed.

16. The method of claim 15, further comprising:
when the command comprises a data shift-in command, transferring the data payload from the controller to the subset of n buffers.

17. The method of claim 16, further comprising:
issuing a media write command to cause the non-volatile memory device to store data contained in the subset of n buffers in the memory array.

18. The method of claim 15, further comprising:
when the command comprises a media read command, causing the non-volatile memory device to transfer the data payload from the memory array to the subset of n buffers.

19. The method of claim 18, further comprising:
issuing a data shift-out command to transfer the data payload contained in the subset of n buffers to the controller.

20. The method of claim 15, further comprising:
using a unique buffer identifier for at least one buffer of the subset of n buffers when specifying a subset of n buffers of the plurality of buffers.

21. The method of claim 15, further comprising:
issuing at least one command at any one time to cause a transfer of the data payload between the subset of n buffers and the memory array.

22. The method of claim 15, further comprising:
suspending the transfer of the data payload between the subset of n buffers and the memory array relating to the first command prior to completion;
completing a transfer of a data payload between the subset of m buffers and the memory array relating to the second command;
resuming the transfer of the data payload relating to the first command.

23. The method of claim 22, wherein the first command is associated with a first priority value and the second command is associated with a second priority value different to the first priority value, the second priority value being greater than the first priority value.

* * * * *